United States Patent
Park

(10) Patent No.: US 8,147,018 B2
(45) Date of Patent: Apr. 3, 2012

(54) IMAGE FORMING APPARATUS AND CONTROL METHOD THEREOF

(75) Inventor: Kyoung-sik Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1274 days.

(21) Appl. No.: 11/500,471

(22) Filed: Aug. 8, 2006

(65) Prior Publication Data

US 2007/0070370 A1    Mar. 29, 2007

(30) Foreign Application Priority Data

Sep. 24, 2005 (KR) .................. 10-2005-0089045

(51) Int. Cl.
*B41J 29/38* (2006.01)

(52) U.S. Cl. .................... 347/5; 347/9; 347/10

(58) Field of Classification Search ............ 347/5, 9–12, 347/32

See application file for complete search history.

(56) References Cited

U.S. PATENT DOCUMENTS

| | | | |
|---|---|---|---|
| 6,116,721 A * | 9/2000 | Higuchi et al. | 347/46 |
| 6,494,565 B1 | 12/2002 | Ellson et al. | |
| 6,582,062 B1 * | 6/2003 | Childers et al. | 347/59 |
| 6,825,954 B1 | 11/2004 | Nakamura | |
| 2003/0159077 A1 | 8/2003 | Matsuo et al. | |
| 2004/0223016 A1 * | 11/2004 | Koyama | 347/12 |

FOREIGN PATENT DOCUMENTS

| | | |
|---|---|---|
| CN | 1524695 A | 9/2004 |
| CN | 200610159502.4 | 9/2006 |
| JP | 60 156126 | 8/1985 |
| JP | 01-205220 | 8/1989 |
| JP | 08 072363 | 3/1996 |
| JP | 09 130570 | 5/1997 |
| JP | 09130570 A * | 5/1997 |
| JP | 2000 341446 | 12/2000 |
| JP | 2001-129991 | 5/2001 |
| JP | 2004-181943 | 7/2004 |
| KR | 1994-0013828 | 7/1994 |
| KR | 2006-0082651 A | 7/2006 |

* cited by examiner

*Primary Examiner* — Julian Huffman
*Assistant Examiner* — Jason Uhlenhake
(74) *Attorney, Agent, or Firm* — Roylance, Abrams, Berdo, & Goodman, L.L.P.

(57) ABSTRACT

An image forming apparatus comprises a plurality of data output parts for outputting printing data corresponding to a plurality of colors in synchronization with a reference clock signal. A clock control part controls the reference clock signal to be input to the data output parts, respectively. A control part outputs an initial clock signal forming the basis of the reference clock signal and initial data forming the basis of the printing data to the data output parts, and controls the clock control part to output the reference clock signal to the data output parts when the initial data corresponding to the colors corresponding to the data output parts are output to the data output parts. Accordingly, an image forming apparatus which is capable of reducing power wastefully consumed in a data output part and a control method thereof are provided.

11 Claims, 4 Drawing Sheets

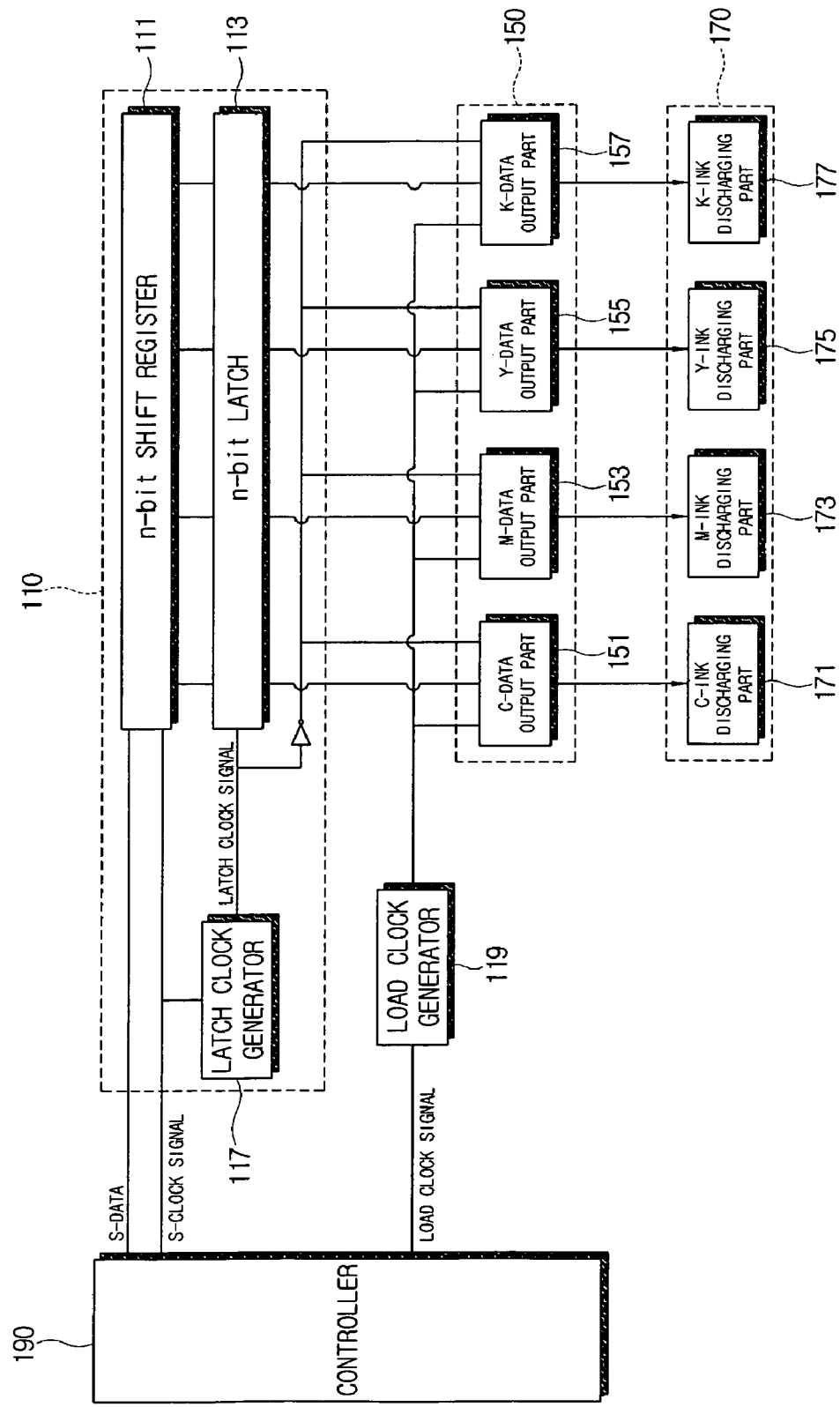
FIG. 4
(CONVENTIONAL)

IMAGE FORMING APPARATUS AND CONTROL METHOD THEREOF

CROSS-REFERENCE TO RELATED APPLICATIONS

This application claims the benefit under 35 U.S.C. §119 of Korean Patent Application Serial No. 2005-0089045, filed on Sep. 24, 2005, in the Korean Intellectual Property Office, the entire contents of which are hereby incorporated by reference.

BACKGROUND OF THE INVENTION

1. Field of the Invention

The present invention relates to an image forming apparatus and a control method thereof. In particular, the present invention relates to an image forming apparatus for forming an image by discharging ink on an external print object, and a control method thereof.

2. Description of the Related Art

In general, an image forming apparatus refers to a copy machine, a printer, an MFP (Multi Function Peripheral), a facsimile machine, and the like. The MFP refers to a multifunction terminal implemented by integrating individual terminals, such as a facsimile machine, a scanner, a printer, a copy machine and the like, into one body, and is used independently or through connection to a computer.

As one example of the image forming apparatus, an inkjet printer includes a head for discharging ink and a controller for controlling the head.

A conventional image forming apparatus, as illustrated in FIG. 4, includes a head having an n-bit shift register 111 and an n-bit latch 113, and a controller 190 for controlling the head. Here, the controller 190 outputs a serial clock signal (S-clock signal) and serial data (S-data) to a data driver 110 of the head, the n-bit shift register 111 of the data driver 110 receives and stores the serial clock signal and the serial data, the n-bit latch 113 outputs the serial data to a data output part 150 in parallel, and the data output part 150 outputs the serial data to an ink discharging part 170 for discharging ink. Here, the data output part 150 may be plural in number corresponding to colors of ink of the ink discharging part 170. That is, assuming that the ink is composed of four colors of cyan (C), magenta (M), yellow (Y) and black (K), the data output part 150 may be composed of a C-data output part 151 corresponding to cyan, a M-data output part 153 corresponding to magenta, a Y-data output part 155 corresponding to yellow, and a K-data output part 157 corresponding to black, and the ink discharging part 170 may be composed of a C-ink discharging part 171 corresponding to cyan, a M-ink discharging part 173 corresponding to magenta, a Y-ink discharging part 175 corresponding to yellow, and a K-ink discharging part 177 corresponding to black.

Presently, when a data output part 151, 153, 155 or 157 of output parts 150 provided in the conventional image forming apparatus is not used for its corresponding color, all of the data output parts 150 nonetheless receive a latch clock signal output through the data driving part 110. Accordingly, the conventional image forming apparatus has a problem of wasteful power consumption on data output part with is not used, but operates to receive the latch lock signal.

SUMMARY OF THE INVENTION

Accordingly, exemplary aspects of the present invention provide an image forming apparatus which is capable of reducing the amount of power wastefully consumed in a data output part and a control method thereof.

The aspect of the present invention is achieved by providing, for example, an image forming apparatus comprising a data driving part for outputting data corresponding to a plurality of colors, a plurality of data output parts for outputting printing data corresponding to the plurality of colors, respectively, and a control part for outputting the data to the data driving part, and for outputting a clock control signal which causes to input to the data output parts corresponding data output from the data driving part when the data corresponding to the colors corresponding to the data output parts exist.

According to an exemplary embodiment of the present invention, the data driving part generates a latch clock signal. The image forming apparatus further comprises a clock control part for controlling the latch clock signal to be input to the data output parts, respectively, depending on the clock control signal.

According to an exemplary embodiment of the present invention, the clock control part comprises a multiplexer having a first input port to receive the reference clock signal and a second input port to receive a ground signal.

According to an exemplary embodiment of the present invention, the data output part does not output the printing data when the ground signal is received in the data output part.

According to an exemplary embodiment of the present invention, the image forming apparatus further comprises a plurality of ink discharging parts for discharging ink of the colors corresponding to the printing data based on the printing data output from the plurality of data output parts.

According to an exemplary embodiment of the present invention, the number of the clock control parts is less than the number of the data output parts.

According to an exemplary embodiment of the present invention, the image forming apparatus further comprises a data driving part for converting the initial clock signal output from the control part into the reference clock signal.

According to an exemplary embodiment of the present invention, the data output from the control part are a serial signal, and the data driving part converts the serial data into a parallel signal.

According to an exemplary embodiment of the present invention, the plurality of ink discharging parts and the plurality of data output parts are provided corresponding to cyan, magenta, yellow and black colors, and the clock control part is provided corresponding to at least one of the colors.

An exemplary aspect of the present invention is achieved by providing a control method of an image forming apparatus comprising a plurality of data output parts for outputting printing data corresponding to plurality of colors. The method comprises converting a clock signal into a latch clock signal, controlling the latch clock signal to be applied to the data output parts depending on a clock control signal regarding whether the data corresponding to the colors corresponding to the data output parts exist.

According to an exemplary embodiment of the present invention, the control method further comprises inputting to the data output parts corresponding data output from a data driving part when the latch clock signal was applied to the data output parts depending on the clock control signal.

According to an exemplary embodiment of the present invention, the control method further comprises discharging ink of the colors corresponding to the printing data based on the printing data output from the data output part.

BRIEF DESCRIPTION OF THE DRAWINGS

The above and/or other exemplary aspects and advantages of the present invention will become apparent and more readily appreciated from the following description of the exemplary embodiments, taken in conjunction with the accompanying drawings in which like reference numerals will be understood to refer to like parts, components and structures, where:

FIG. 4 is a control diagram of a conventional image forming apparatus.

DETAILED DESCRIPTION OF EXEMPLARY EMBODIMENTS

Reference will now be made in detail to exemplary embodiments of the present invention, examples of which are illustrated in the accompanying drawings.

Figure 1:
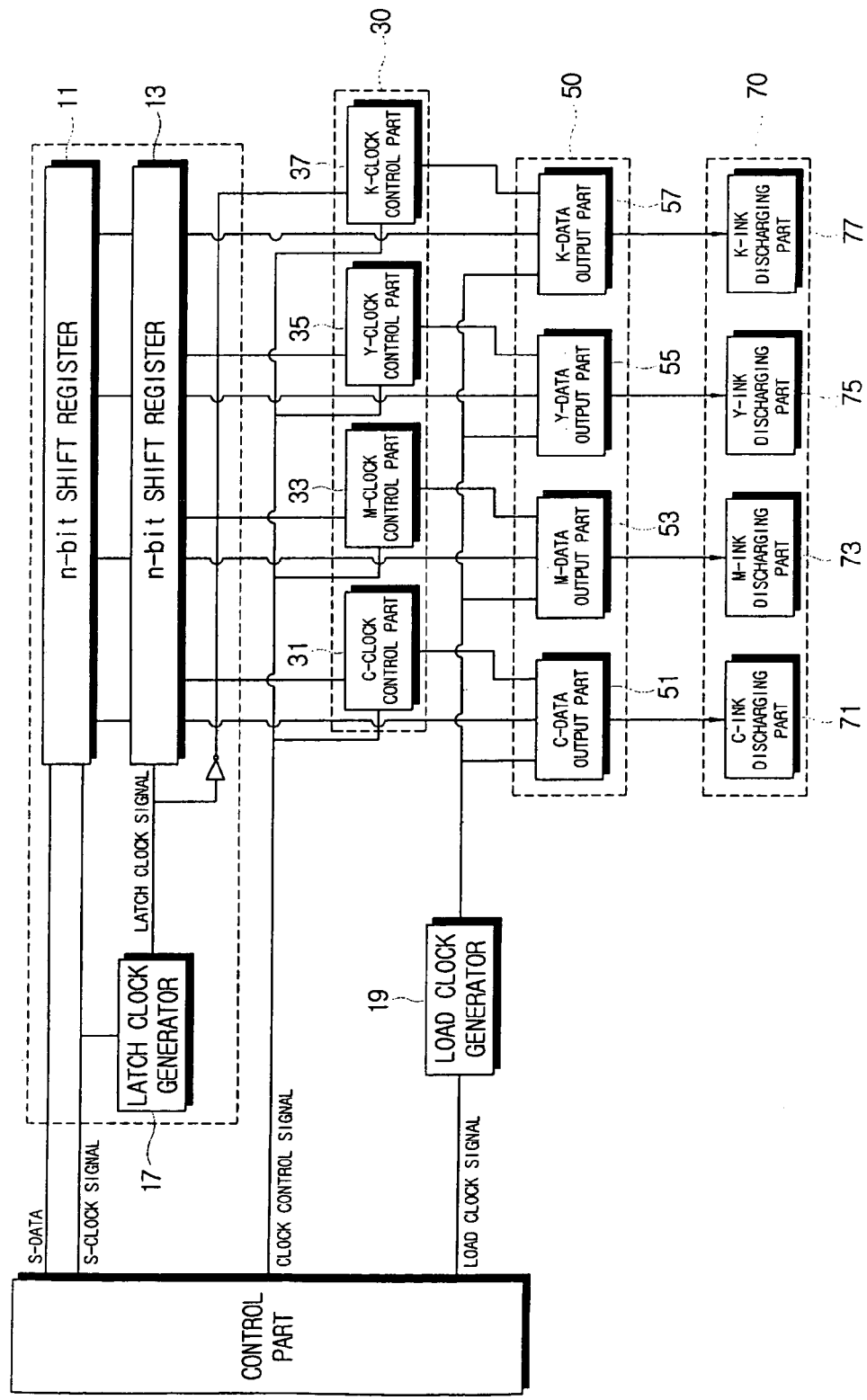
FIG. 1 is a control block diagram of an image forming apparatus according to an exemplary embodiment of the present invention.

As shown in FIG. 1, an image forming apparatus according to an embodiment of the present invention includes a data driving part 10, a clock control part 30 for controlling output of a latch clock signal output from the data driving part 10, a data output part 50 for outputting printing data based on the latch clock signal output from the clock control part 30, and a control part 90 for controlling these components. In addition, the image forming apparatus according to an exemplary embodiment of the present invention may further includes an ink discharging part 70 for discharging ink based on the printing data output from the data output part 50. For clarity of explanation, it is hereinafter assumed that the ink is composed of cyan (C), magenta (M), yellow (Y), and black (K).

The control part 90 provided in the image forming apparatus according to an exemplary embodiment of the present invention includes a head controller of an inkjet print, and each of the data driving part 10, the clock control part 30 and the data output part 50 may include a head chip.

When the image forming apparatus operates a printing operation, the control part 90 transmits serial data and a serial clock signal to the data driving part 10 in series in order to discharge ink from the ink discharging part 70.

The data driving part 10 includes an n-bit shift register 11, an n-bit latch 13 and a latch clock generator 17.

The n-bit shift register 11 receives and sequentially stores the serial data of n bits based on the serial clock signal received from the control part 90 and outputs the stored serial data to the n-bit latch 13. Through such a process, the serial data can be sequentially transmitted by four bits in the form of [C0, M0, Y0, K0], [C1, M1, Y1, K1], . . . , [Cn, Mn, Yn, Kn]. The transmitted serial data are converted into parallel data of n bits in the n-bit shift register 11. That is, the n-bit shift register 11 stores the 4-bt serial data [C0~Cn], [M0~Mn], [Y0~Yn] and [K0~Kn] as the parallel data for each ink color and then outputs the stored parallel data to the n-bit latch 13.

According to an exemplary implementation, the parallel data output to the n-bit latch 13 are latched by the latch clock signal generated by counting the serial clock signal in the latch clock generator 17.

The clock control part 30 controls the latch clock signal output from the latch clock generator 17. Thus, the clock control part 30 determines whether or not the latch clock signal is applied to the data output part 50. The clock control part 30 may include at least one of a plurality of clock control parts 30 corresponding to colors of the ink, that is, a C-clock control part 31 corresponding to cyan, a M-clock control part 33 corresponding to magenta, a Y-clock control part 35 corresponding to yellow, and a K-clock control part 37 corresponding to black. Here, each clock control part 30 controls the latch clock signal based on a clock control signal of the control part 90, which will be described later.

According to an exemplary implementation, when each clock control part 30 includes a multiplexer, a first input port of the multiplexer may be applied with the latch clock signal and a second input port of the multiplexer may be grounded. In this case, one of the latch clock signal applied to the first input port of the multiplexer and a ground signal applied to the second input port of the multiplexer is output to the data output part 50 through an output port of the multiplexer based on the clock control signal transmitted via a select line of the multiplexer.

The data output part 50 outputs the printing data corresponding to a corresponding color of a corresponding data output part 50 to the ink discharging part 70 in synchronization of the parallel data output from the data driving part 10 with the latch clock signal output from the clock control signal 30.

The data output part 50 may include a plurality of data output parts 50 corresponding to colors of the ink, that is, a C-data output part 51 corresponding to cyan, a M-data output part 53 corresponding to magenta, a Y-data output part 55 corresponding to yellow, and a K-data output part 57 corresponding to black.

The ink discharging part 70 discharges the ink on an external print object based on the printing data output from the data output part 50. Here, the ink discharging part 70 may also include a C-ink discharging part 71 corresponding to cyan, a M-data ink discharging part 73 corresponding to magenta, a Y-data ink discharging part 75 corresponding to yellow, and a K-data ink discharging part 77 corresponding to black. Thus, the ink discharging part 70 may discharge only ink of required colors of cyan, magenta, yellow and black.

The control part 90 outputs the serial data and the serial clock signal to the data driving part 10 in series, as described above. In addition, the control part 90 generates the clock control signal based on the serial data and the serial clock signal. Accordingly, when data corresponding to each color is outputted, the clock control signal controls the clock control part 30 such that the latch clock signal is output from the clock control part 30 when the data are converted and applied to the data output part 50. Thus, the data driving part 10 outputs the printing data generated in synchronization of the latch clock signal with the parallel data.

Here, the clock control signal may be designed as shown in the following table by way of an example.

TABLE

| Value of clock control signal | Operation of clock control part |
| --- | --- |
| 4 'h1 | C-latch clock signal OFF |
| 4 'h2 | M-latch clock signal OFF |
| 4 'h3 | Y-latch clock signal OFF |
| 4 'h4 | K-latch clock signal OFF |
| 4 'h5 | C-latch clock signal and M-latch clock signal OFF |
| 4 'h6 | C-latch clock signal and Y-latch clock signal OFF |
| . . . | . . . |

The clock control signal listed in the above Table may have a value corresponding to 4 bits. According to an exemplary implementation, with change of the value of the clock control signal, the clock control signal may control the clock control part 30 corresponding to each color such that only the latch clock signal corresponding to a required color is outputted from the clock control part 30 to the data output part 50.

For example, upon receiving the clock control signal having a value of 4'h1, only the C-clock control part 31 outputs a ground signal and the remaining M-clock control part 33, Y-clock control part 35 and K-clock control part 37 output the latch clock signal to the data output part 50.

In addition, the controller 90 may output a load clock signal informing the end of data group in the data driving part 10 to a load clock generator 19.

Figure 2:
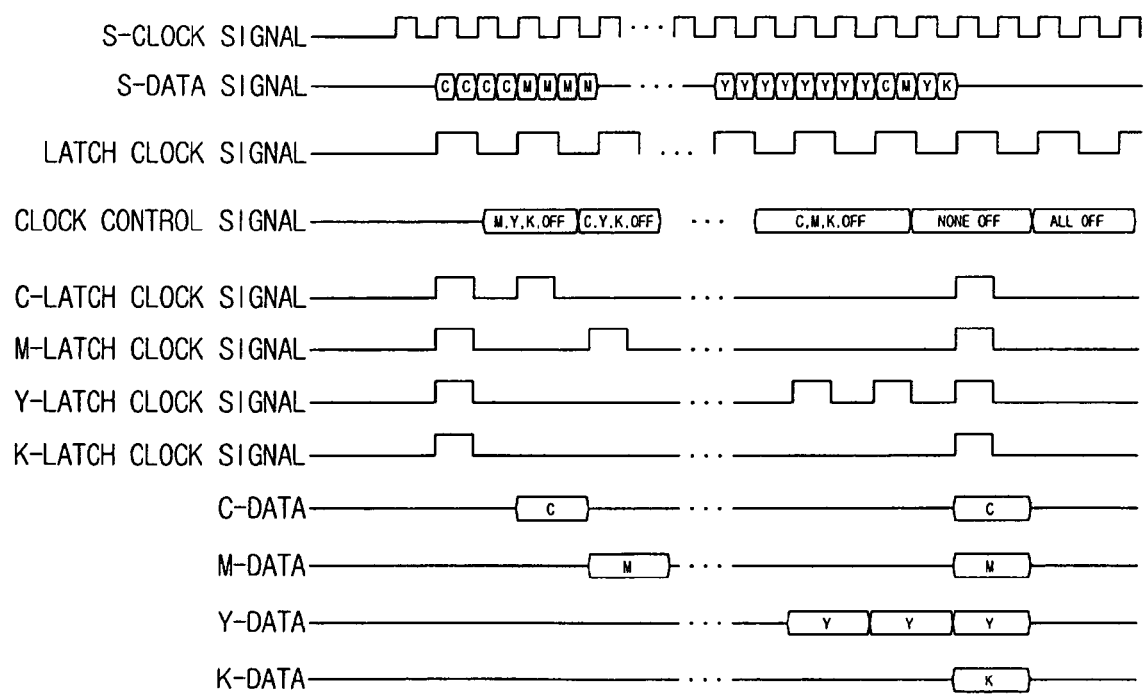
FIG. 2 is a timing diagram of clock signals and printing data in the image forming apparatus according to an exemplary embodiment of the present invention.

FIG. 2 is a timing diagram of various signals and printing data in the image forming apparatus according to an exemplary embodiment of the present invention.

As shown in FIG. 2, the control part 90 of the image forming apparatus output the serial clock signal and the serial data to the data driving part 10. According to an exemplary implementation, the latch clock generator 17 may generate the latch clock signal having a period, which is double a period of the serial clock signal.

In FIG. 2, the C-latch clock signal, the M-latch clock signal, the Y-latch clock signal and the K-latch clock signal are signals output from the C-clock control part 31, the M-clock control part 33, the Y-clock control part 35 and the K-clock control part 37, respectively.

As shown in the figure, the serial data may be input four times in one period of the latch clock signal and the printing data output from the data output part 50 may be output later by one period of the latch clock signal than the serial data.

When the serial data are composed of, for example, C, C, C, C, M, M, M, M, ..., Y, Y, Y, Y, Y, Y, Y, Y, C, M, Y, B, ..., the clock control signal first controls the M-clock control part 33, the Y-clock control part 35 and the K-clock control part 37 to make the latch clock signal off and output the ground signal according to the serial data of C, C, C, C. Then, the C-latch clock signal is applied to only the C-data output part 51. At this time, the parallel data composed of cyan data are input to the data output part 50. Then, the data output part 50 outputs the printing data to the C-ink discharging part 71 in synchronization of the parallel data with the C-latch clock signal. Accordingly, the C-ink discharging part 71 discharges ink of cyan color. Similarly, the clock control signal controls the C-clock control part 31, the Y-clock control part 35 and the K-clock control part 37 to make the latch clock signal off and output the ground signal according to the serial data of M, M, M, M. Then, the M-data output part 53 outputs the printing data to the M-ink discharging part 73 in synchronization of the parallel data, which are composed of magenta data input through the data driving part 10, with the M-latch clock signal. The M-ink discharging part 73 discharges ink of magenta color.

in an exemplary implementation, when the C, M, Y and K serial data are output to the data driving part 10, the clock control signal controls the clock control part 30 to output the latch clock signal. If the serial data corresponding to each color are not output, the clock control signal controls the clock control part 30 not to output the latch clock signal to the data output part 50.

Figure 3:
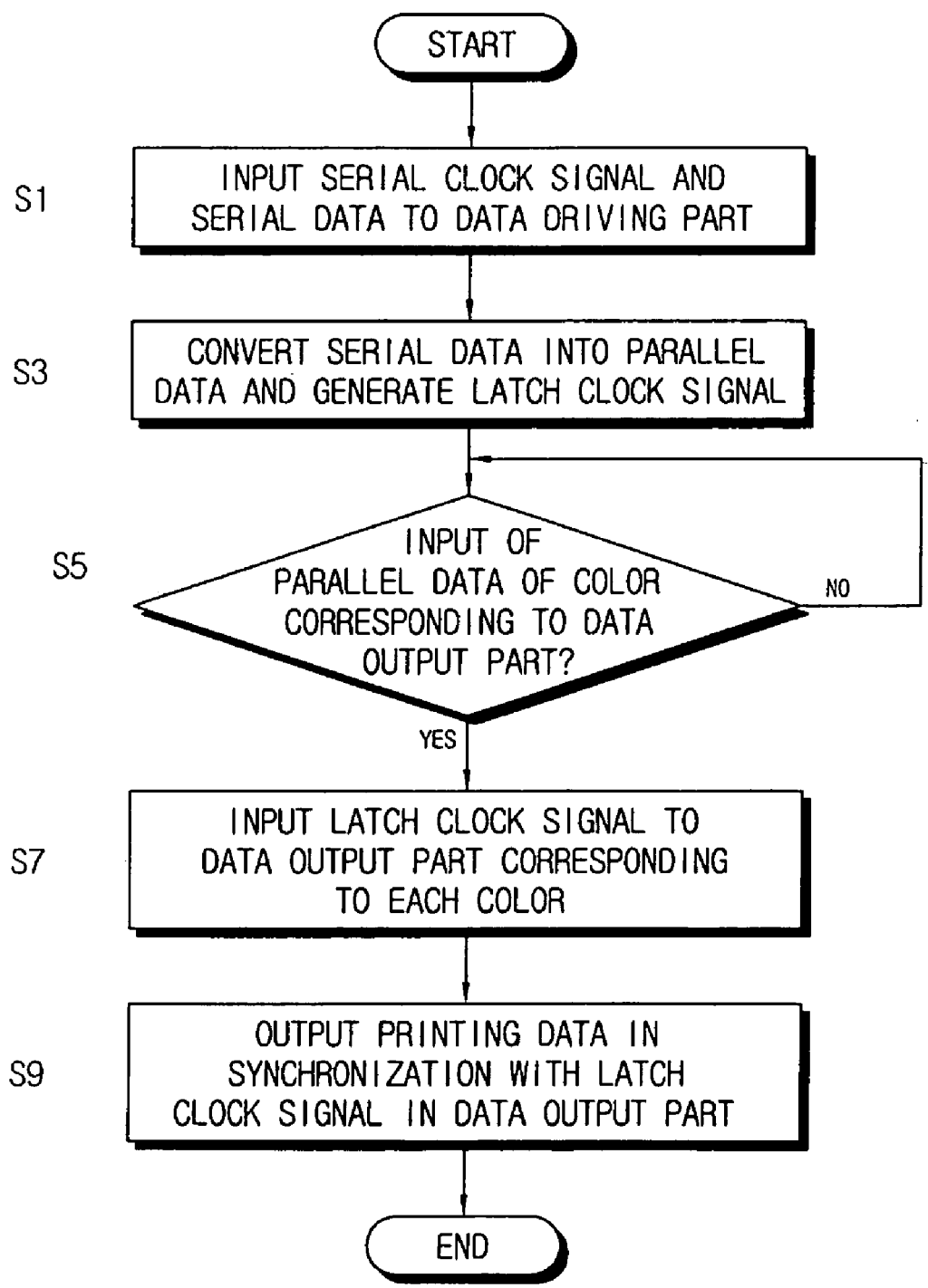
FIG. 3 is a control flow chart of the image forming apparatus according to an exemplary embodiment of the present invention.

Referring to FIG. 3, at operation S1, the control part 90 of the image forming apparatus according to an exemplary embodiment of the present invention outputs the serial clock signal and the serial data to the data driving part 10. At operation S3, the data driving part 10 converts the serial data into the parallel data and generates the latch clock signal based on the serial clock signal. Then, the data driving part 10 outputs the latch clock signal to the clock control part 30 and outputs the parallel data to the data output part 50. The clock control part 30 controls the latch clock signal to be output to the data output part 50 based on the clock control signal from the control part 90. Specifically, if it is determined at operation S5 that the parallel data output to the data output part 50 include color information corresponding to a relevant data output part 50, that is, the parallel data are used for a color corresponding to the relevant data output part 50, the control part 90 controls the clock control part 30 to output the latch clock signal to only the data output part 50 corresponding to the color at operation S7. Then, the data output part 50 outputs the printing data to the ink discharging part 70 in synchronization with the latch clock signal at operation S9. Then, the ink discharging part 70 discharges ink of the color.

For example, when [M, M, M, M] serial data are input to the data driving part 10, the data driving part 10 converts the serial data into the parallel data to be output to the data output part 50 and generates the latch clock signal to be output to the clock control part 30. At this time, the control part 90 outputs the clock control signal to the clock control part 30. The clock control signal controls the C-clock control part 31, the Y-clock control part 35 and the K-clock control part 37 to interrupt the latch clock signal and controls only the M-clock control part 35 to output the latch clock signal to the data output part 50. Then, only the M-data output part 53 input with the M-latch clock signal output from the M-clock control part 33 operates to output the printing data of a relevant color to the ink discharging part 70. Then, the ink discharging part 70 discharges ink of magenta color.

Although it is illustrated in these exemplary embodiments that the image forming apparatus uses ink of cyan (C), magenta (M), yellow (Y) and black (K), the ink may contain various colors such as green, pink and so on, if necessary, without any limitation.

In addition, although it is illustrated in these exemplary embodiments that the clock control part 30 of the image forming apparatus is provided corresponding to cyan, magenta, yellow and black colors, respectively, and the clock control signal is composed of 4 bits and controls the clock control part 30 corresponding to each color, the clock control part 30 may be provided corresponding to some of the colors and the clock control signal may control only the clock control part 30 corresponding to some of the colors. For example, if the image forming apparatus of the present invention uses the cyan, magenta, yellow and black colors and the clock control part 30 is provided corresponding to the cyan and yellow colors, the clock control signal may be composed of 2 bits and control only the clock control part 30 corresponding to the cyan and yellow colors.

As apparent from the description, certain exemplary embodiments of the present invention provide an image forming apparatus and method, which are capable of reducing power consumption by receiving the latch clock signal and generating the printing data only when the data output part is used.

Although certain exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:
1. An image forming apparatus comprising:
   a data driving part for outputting data corresponding to a plurality of colors;
   a plurality of data output parts for outputting printing data corresponding to the plurality of colors, respectively;

a plurality of clock control parts corresponding to plurality of colors; and a control part for outputting the data to the data driving part, and for outputting a clock control signal that allows data output from the data driving part to be input to the data output parts only when the data requires a color that corresponds to a respective data output part, wherein a data output part does not output the printing data when a ground signal is received in the data output part, wherein each clock control part corresponds to a distinct ink color.

2. An image forming apparatus according to claim 1, wherein the data driving part generates a latch clock signal, and the plurality of clock control parts controls the latch clock signal to be input to the data output parts, respectively, depending on the clock control signal.

3. The image forming apparatus according to claim 2, wherein the clock control part comprises a multiplexer having a first input port to receive the latch clock signal and a second input port to receive a ground signal.

4. The image forming apparatus according to claim 3, further comprising a plurality of ink discharging parts for discharging ink of at least one of colors corresponding to the printing data based on the printing data output from the plurality of data output parts.

5. The image forming apparatus according to claim 4, wherein the number of the clock control parts is less than, or equal to, the number of the data output parts.

6. The image forming apparatus according to claim 5, wherein the control part outputs a clock signal, and wherein the data driving part converts the clock signal into the latch clock signal.

7. The image forming apparatus according to claim 6, wherein the data output from the control part comprise a serial signal, and wherein the data driving part converts the serial signal into a parallel signal.

8. The image forming apparatus according to claim 7, wherein the plurality of ink discharging parts and the plurality of data output parts are provided corresponding to cyan, magenta, yellow and black colors, and wherein the plurality of clock control parts corresponds to at least one of the cyan, magenta, yellow and black colors.

9. A control method of an image forming apparatus comprising a plurality of clock control parts corresponding to a plurality of ink colors and a plurality of data output parts for outputting printing data corresponding to a plurality of colors, the method comprising:

converting a clock signal into a latch clock signal; and controlling the latch clock signal to be applied to data output parts depending on a clock control signal, which only allows the latch clock signal corresponding to an existing required color to be applied to the data output parts and wherein a data output part does not output the printing data when a ground signal is received in the data output part, wherein each clock control part corresponds to a distinct ink color.

10. The control method according to claim 9, further comprising inputting to the data output parts corresponding data output from a data driving part when the latch clock signal was applied to the data output parts depending on the clock control signal.

11. The control method according to claim 10, further comprising discharging ink of at least one of colors corresponding to the printing data based on the printing data output from the data output part.

* * * * *